United States Patent [19]

Kuebler

[11] 4,038,639

[45] July 26, 1977

[54] BIRD PERCH ALARM

[76] Inventor: Glenn M. Kuebler, Rte. 3, Box 128, Bell Road, Newburgh, Ind. 47630

[21] Appl. No.: 649,643

[22] Filed: Jan. 16, 1976

[51] Int. Cl.² .............................................. G08B 21/00
[52] U.S. Cl. ...................................... 340/272; 52/101; 119/26; 340/279
[58] Field of Search .................. 340/272, 279; 119/26; 52/101; 200/61.58 R, 61.62, 85 R

[56] References Cited

U.S. PATENT DOCUMENTS 3,041,911   7/1962   Marder ............................. 119/26 X
3,847,120   11/1974  Hicks ............................... 119/26 X Primary Examiner—Glen R. Swann, III
Attorney, Agent, or Firm—Warren D. Flackbert

[57] ABSTRACT

A bird perch alarm characterized by a perch assembly responsive to the weight of a bird, the movement thereof completing electrical circuitry and causing an audible signal. Resilient means form a part of the perch assembly, affording critical sensitivity to the bird's weight.

2 Claims, 4 Drawing Figures

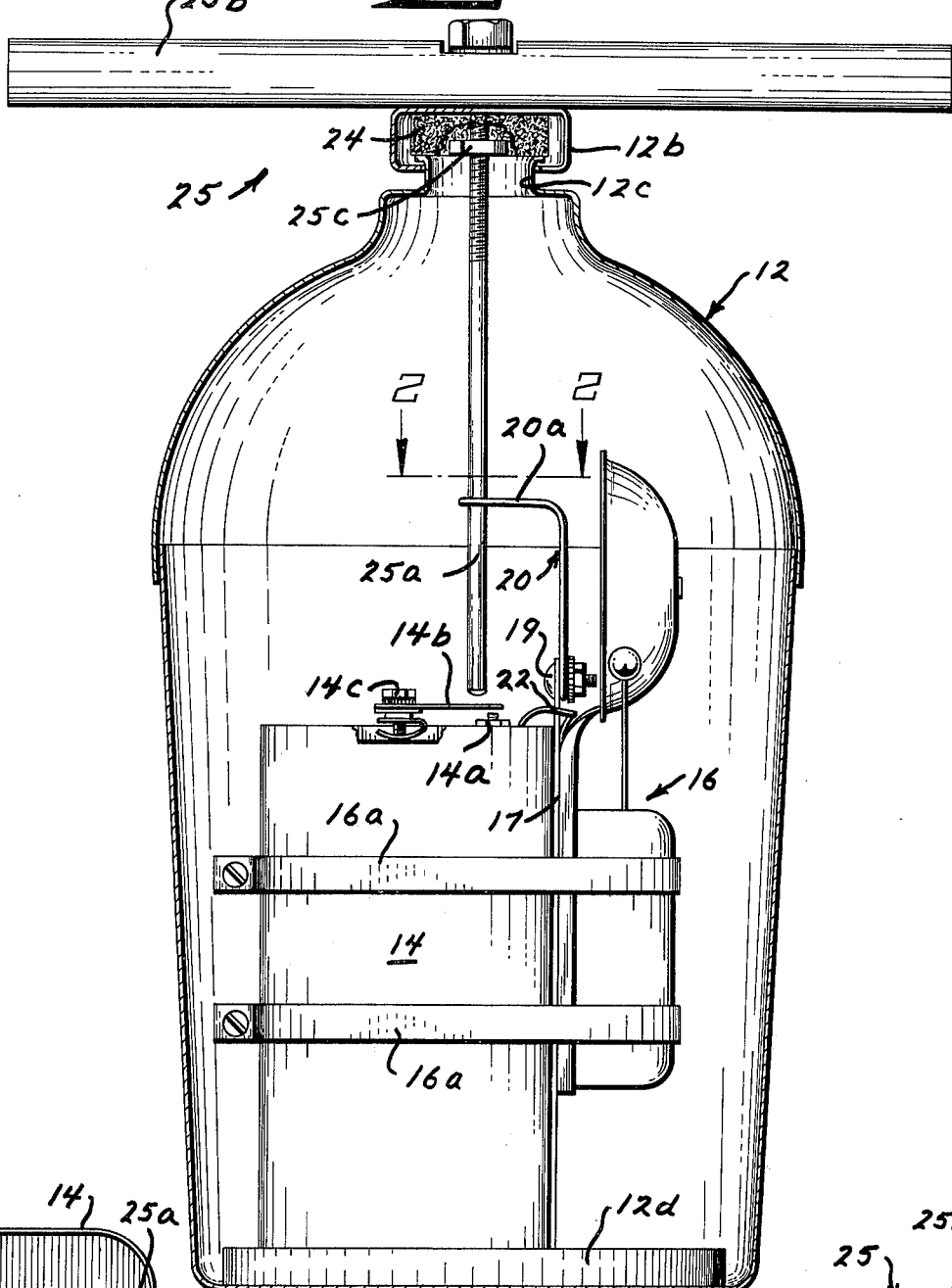

BIRD PERCH ALARM

With the continued popularity of home gardening, for example, it is desirable to use various approaches for frightening away birds that may cause damage to the seeded and growing crop. In this connection, oftentimes "scarecrow" type devices are employed, but such do not create a positive continued guarding effect against the damaging wildlife.

As a result of the preceding, it has become desirable to consider other approaches for frightening birds from any desired area. The invention satisfies the problem, involving, in a preferred form, a portable container having a bird perch assembly arrangement at an upper portion thereof. The aforesaid bird perch assembly is resiliently mounted on the container, being particularly sensitive to the weight of an alighting bird. More specifically, when the bird perch moves in a downward direction, an electrical circuitry is completed through a conventional battery, causing an audible alarm, as a bell, to sound, and resulting in the frightening of the bird from the particular location.

The invention affords a simple approach for a protection system against birds, being represented by a minimum number of components in a readily portable arrangement. In this connection, the container for the bird perch alarm may be placed at any desired location, typically being positioned on a post in a garden area.

In any event, a better understanding of the present invention will become more apparent from the following description, taken in conjunction with the accompanying drawing, wherein FIG. 1 is a view in elevation, partly in vertical section, showing a bird perch alarm in accordance with the teachings of the invention;

FIG. 2 is a fragmentary top plan view, partly in horizontal section, taken at line 2—2 on FIG. 1 and looking in the direction of the arrows, showing certain details of the mechanical and electrical arrangement of the invention;

FIG. 3 is a fragmentary view in elevation, partly in vertical section, showing details of the bird perch assembly; and, FIG. 4 is a view in elevation, in reduced scale, showing a typical form of assembled unit.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the bird perch alarm of the invention typically includes a mounting framework or container 12 having a handle 12a (see FIG. 4) to provide for the ready movement thereof to any desired site of use. An electric storage battery 14, supporting a conventional alarm or bell mechanism 16 through brackets 16a, is disposed within the container 12 on a base 12d. A plate 17 extends upwardly along one side of the battery 14, positioning nut and bolt type connectors 19.

A guide member 20 is secured to the plate 17 by connectors 19, where free upper end 20a of the guide member 20 is looped to receive plunger rod 25a of a perch assembly 25 (see FIGS. 1 and 2). An electrical connection, by conductor 22, is made between the bell mechanism 16 and a contact 14a on the upper surface of the battery 14. As evident in FIGS. 1 and 2, the plunger rod 25a is placed to selectively engage an arm 14b mechanically and electrically connected to the battery 14 at 14c. The guide member 20 further serves as ground for the electrical circuitry.

Referring to the upper portion of FIG. 1 and to FIG. 3, the perch assembly 25 includes a laterally extending perch member 25b, typically wooden, retained on the upper surface of a cap 12b for the container 12. The preceeding is accomplished by reason of the head of the plunger rod 25a and a nut 25c threadedly received on the plunger rod 25a.

Importantly, a layer of resilient material 24, such as foam rubber, is disposed within the cap 12b, being positioned by the nut 25c. Thus, the perch assembly 25 includes, as a unit, the perch member 25b, the cap 12b, the resilient material 24 and the headed plunger rod 25a, retained together by nut 25c.

It should be understood that, typically, a snap-fit relationship exists between the cap 12b and neck 12c of the container 12. In other words, the arrangement provides for a loose fit of the cap 12b on the neck 12c, permitting the desired movement thereof, and the plunger rod 25a, in response to the weight of a bird alighting on the perch member 25b, to be discussed below.

In use, the perch assembly 25 is positioned on the container 12 as shown in FIG. 1, where the illustrated spacing between the lower end of the plunger rod 25a and the arm 14b is somewhat exaggerated for purposes of understanding. When a bird alights on the perch member 25b, the plunger rod 25a moves slightly in a downward direction, making contact with arm 14b and completing an electrical circuit. When the preceding occurs, the bell mechanism 16 makes an audible sound, and the frightened bird flies away from the bird perch alarm. FIG. 3 is representative of the compressed nature of the resilient material 24 at an alarm position.

It should be understood that such resilient material 24 plays importance in the practice of the invention, permitting a quite sensitive reaction of the perch assembly 25 to the weight of a bird. The preceding is a necessary factor, considering the small weight involved.

The bird perch alarm described hereabove is susceptible to various changes within the spirit of the invention. In this connection, and as a matter of example, the mounting of the cap 12b on the container 12 may be otherwise accomplished, the type of guide member 20 modified, and the like. Thus, the preceding should be considered illustrative, and not as limiting the scope of the following claims:

I claim:

1. A bird perch alarm comprising a movable bird perch assembly mounted on a housing and responsive to the weight of an alighting bird, said bird perch assembly including a cap mounted on a neck of said housing and a plunger extending into said housing through said neck, resilient material disposed within said cap compressing upon movement of said cap on said neck by an alighting bird, audible means responsive to movement of said plunger, and an electrical circuit to said audible means completed upon movement of said plunger.

2. The bird perch alarm of claim 1 where said resilient material is a foam.

* * * * *